D. L. LINDQUIST.
SAFETY BRAKE APPARATUS.
APPLICATION FILED FEB. 1, 1915.
1,190,925.
Patented July 11, 1916.
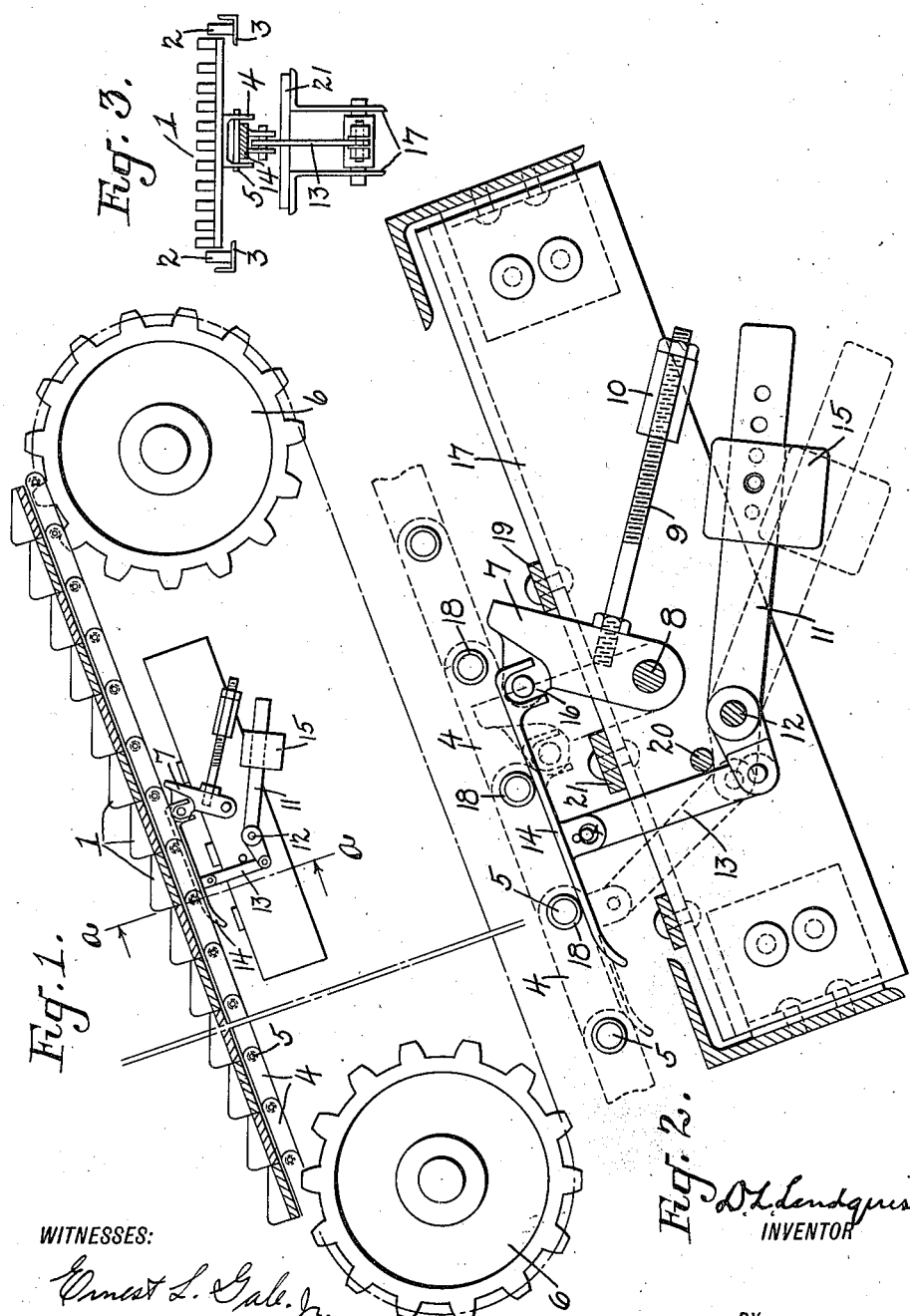

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

SAFETY BRAKE APPARATUS.

1,190,925.  Specification of Letters Patent.  Patented July 11, 1916.

Application filed February 1, 1915. Serial No. 5,412.

*To all whom it may concern:*

Be it known that I, DAVID L. LINDQUIST, a subject of the King of Sweden, residing in Yonkers, in the county of Westchester and State of New York, have invented a new and useful Improvement in Safety Brake Apparatus, of which the following is a specification.

My invention relates to improvements in safety brake apparatus, the same being of a type more particularly adapted for use in conjunction with endless inclined conveyers or elevators.

One of the objects of the invention is to provide apparatus of the above-noted character which operates automatically to check the movement of the conveyer or apply braking power thereto in case of accidental descent or runaway of the conveyer.

Another object of the invention is the provision of a pawl brake which is noiseless, this result being attained by a novel arrangement of friction actuated mechanism which retains the pawl in a normal or inoperative position when the conveyer ascends, and actuates the pawl to check a movement of the conveyer in a descending direction.

Still another object is the provision of means which are simple and cheap to construct, and which involve very little labor in the manufacture and installation thereof.

Other objects will appear hereinafter, the novel combinations and arrangement of parts being pointed out in the appended claims.

Referring now to the accompanying drawings, Figure 1 illustrates an endless conveyer in transverse section, with the application thereto of my improved safety brake apparatus; Fig. 2 is an enlarged view of the safety brake apparatus; Fig. 3 is a section of Fig. 1, taken on the line *a—a*, in the direction of the arrows as indicated.

In the following description, general reference only will be made to the construction, etc., of the inclined conveyer, the same being of the well known Reno type which is well known in the art, and is therefore illustrated herein in typical form.

The conveyer comprises an endless series of steps or tread belts 1 which may be of the cleat type, the same being provided with rollers 2 adapted to travel on track rails 3, which may be secured to a suitable supporting structure.

Any suitable form of driving chain or links may be provided, the same in the present instance consisting of the links 4 connected by pins 5, the said links being rigidly secured to the under side of the steps and forming an endless chain. The steps or tread belt pass around suitable sprocket wheels such as 6, either one of which may be driven from any suitable source of power.

Coming now more particularly to my improved safety brake apparatus, it comprises a pawl 7, pivotally supported by a pin 8, the pawl being provided with a stud 9 having a weight 10 adjustable thereon. The bell crank lever 11 is pivoted on a pin 12, one of the arms of the bell crank being connected by an arm 13 to a shoe 14, and the other arm being provided with a weight 15 which may be adjusted on the arm. The shoe 14, is operatively connected to the pawl 7 by a slot and pin connection such as 16. The brake apparatus in its entirety is contained between a pair of angle irons 17, which may be attached in a suitable manner to the supporting structure of the conveyer.

It will be here noted that the shoe 14, is supported in an angular position, corresponding to that of the chain 4, the shoe as a matter of fact being in a line to be frictionally engaged by bushings 18, on the pins 5, as will be seen by reference to Fig. 2.

It is to be further pointed out that the safety brake apparatus in its present application is intended to safeguard against accidental descent of a conveyer whose intended travel is in an ascending direction, the apparatus in the present instance being associated with the working run, or in other words, the ascending run of the conveyer.

Now in the way of describing the apparatus in operation, it is seen that the frictional engagement of the shoe 14 with the ascending links 4, (which frictional engagement is insured by the action of the weighted bell crank), causes the shoe through its connection with the pawl, to maintain the latter in a normal or inoperative position, the weighted stud 9 assisting in maintaining the pawl in the said position. The parts now attain a position as indicated by the full lines as shown in Figs. 1 and 2, the pawl resting against a fixed plate 19, and a movement of the arm 13 being limited by a fixed pin 20. However, if from any cause whatsoever, the conveyer tends to reverse its direction of travel, the frictional engagement of the descending links with the shoe, together with the action of the weighted bell crank lever 11, will now effect movement of the shoe and thus actuate the pawl into the path of movement of the pins 5, and in this manner, brake or check the conveyer in its descent. The parts will now attain a position as indicated in dotted lines, Fig. 2, it being noted that a fixed plate 21, forms an abutment for the pawl, and the pin 20, limiting the movement of the bell crank lever 11.

It will now be seen that the actuating mechanism for the brake or pawl, is dependent on friction caused by movement of the conveyer in other than the intended direction, for operation to check or brake such movement of the conveyer. Furthermore the brake apparatus is simple and durable, as well as cheap to manufacture and install.

It is to be understood of course, that the shoe in carrying out its functions, need not necessarily be associated with the chain, it being evident that it may be positioned in frictional engagement with other parts of the moving conveyer to equally good advantage, such a change involving only slight modifications in the way of connections between the same and the brake device or pawl. Other forms of braking devices might also be used in conjunction with my friction controlled mechanism and I wish therefore not to be limited to the precise construction and arrangement as herein shown and described, since various modifications might readily suggest themselves to those skilled in the art.

What I claim is new and desire to secure by Letters Patent of the United States is:—

1. The combination with an inclined conveyer, of a brake therefor comprising a pawl adapted directly to engage the conveyer, and a shoe in frictional engagement with the conveyer to bring the pawl into direct engagement with the conveyer.

2. The combination with an inclined conveyer, of a brake therefor comprising a pawl adapted directly to engage the conveyer, and a shoe in frictional engagement with the conveyer and connected to the pawl to bring the pawl into direct engagement with the conveyer.

3. The combination with an inclined conveyer, of a brake therefor comprising a pawl, a shoe connected to the pawl and adapted frictionally to engage the conveyer, to maintain the pawl out of engagement with the conveyer for one direction of travel and into engagement with the conveyer for the opposite direction of travel.

4. The combination with an inclined conveyer, of a brake therefor comprising a pawl, a shoe connected to the pawl and in constant frictional engagement with the conveyer to maintain the pawl out of engagement with the conveyer for one direction of travel of the conveyer and to cause the pawl to engage the conveyer for the opposite direction of travel.

5. In apparatus of the class described, the combination with an inclined conveyer, of a brake therefor comprising a pawl, a shoe connected to the pawl and in constant frictional engagement with the conveyer, and a weighted bell crank lever connected to the shoe for supporting the same in constant frictional engagement with the conveyer.

6. In apparatus of the class described, the combination with an inclined conveyer, a drive chain for the conveyer, a pawl adapted to engage the chain, and means operable by frictional engagement with the conveyer when ascending, to keep the pawl in an inoperative position, and to actuate the pawl to engage the chain upon reverse movement of the conveyer.

7. In apparatus of the class described, the combination with an inclined conveyer, a drive chain for the conveyer, a pawl adapted to engage the chain, and means comprising a floating shoe connected to the pawl, adapted to actuate the latter when the conveyer moves in other than an intended direction.

In testimony whereof, I have signed my name to this specification in the presence of two subscribing witnesses.

DAVID L. LINDQUIST.

Witnesses:
   WALTER C. STRANG,
   JAMES G. BETHELL.